UNITED STATES PATENT OFFICE.

LESTER KIRSCHBRAUN, OF EVANSTON, ILLINOIS.

BITUMINOUS COMPOSITION AND PROCESS OF MAKING SAME.

1,302,810.  Specification of Letters Patent.  Patented May 6, 1919.

No Drawing.  Application filed May 8, 1915.  Serial No. 26,813.

*To all whom it may concern:*

Be it known that I, LESTER KIRSCHBRAUN, a citizen of the United States, residing in the city of Evanston, county of Cook, and State of Illinois, have invented certain new and useful Improvements in Bituminous Compositions and Processes of Making Same, of which the following is a specification.

This invention relates to improvements in bituminous compositions and process of making same and refers more particularly to a composition adapted for use in waterproof flooring, coverings, such as roofing, siding, wall boards, etc., and it may be also used as paints and the like, although in its broader aspects the invention is not limited to any specific use.

Among the salient objects of the invention are to provide a waterproof bituminous composition which if desired it may be used as a monolithic flooring; can be laid cold and which forms a resilient, sanitary, rubbery and durable covering; to provide a composition which can be readily laid without the necessity of heating the material, which quickly and permanently sets, which can be laid without the use of relatively expensive vehicles, such as naphthas, benzene and the like; to provide a construction which can be readily, easily and cheaply formed with a coloring which imparts an ornamental effect as desired; to provide a composition which is easily washed and cleaned or repaired; to provide a composition which in addition to being pliable and suitable for flooring and the like, is also readily adapted for use as a paint; to provide a simple and improved process for making said composition.

Describing now the manner of making my improved bituminous composition, I preferably prepare an aqueous paste, which may be prepared by puddling clay or other material which has a substantial percentage of matter of colloidal character. After this paste or vehicle has been worked up to a sufficiently thin consistency, I then add a fluid bitumen. This bitumen may be either natural or artificial asphalt or a prepared asphaltic cement, coal tar pitch, or pitch such as resin and the like. This bitumen may be either used as it is naturally, or with tempering oils, such as petroleum residuum, linseed oil and analogous oils. The bitumen may be either fluid or solid at atmospheric temperatures, but if a solid bitumen is used it must be first softened by heat or otherwise, to a practically liquid condition. In other words, the bitumen must be sufficiently fluid to properly amalgamate and become intimately associated with the paste particles. The bitumen may be mixed with the paste by stirring the two together until they become thoroughly amalgamated with each other. Preferably, this is done by grinding them together. This mixture forms in effect an emulsified bituminous matrix. Water is then added to this emulsified mixture to further thin it. A granular or fibrous filler is then added to the matrix as desired, and thoroughly incorporated with the same. This can be done in a well known form of mixing machine. The fibrous material may consist of leather waste, paper, wood pulp or the like. The described composition may be used in numerous ways for example, as a floor cover or as a paint. When used as a floor in a relatively thin sheet composition it is spread over the floor in substantially the same way as Portland cement mortar. It is to be noted that it is spread cold and troweled and finished to a smooth even surface. As the water evaporates, the bitumen coalesces and the finely divided particles of bitumen attach themselves to the non-bituminous matter and form a unitary monolithic structure. When it is not necessary to produce a monolithic structure the composition may be formed on a suitable support in a relatively thin sheet and dried, and the bitumen allowed to coalesce prior to its application to the floor. When used as a water-proof covering, such as roofing or siding, the composition may be applied in the way above described.

When used as a paint, it is simply spread over the surface with a brush as is the ordinary paint. Upon the evaporation of the water an insoluble waterproof film is left.

I have heretofore stated that my composition may be given any desired coloring by the addition of a pigment. It should be here said however, that it is preferable, where a bright color is desired, that the bitumen used be a resin, as contra-distinguished, for example, from a black asphalt. The resin in this case is softened with wax tailings, linseed oil, or some analogous oils, so that the bituminous cement then prepared shall be colored as little as possible, in order to obtain the full effect of the admixed pigment. The bituminous cement in this case may be for example, formed of 60 per cent. wax tailings and 40 per cent. of resin. Linseed oil may be added to the above mixture and partially or entirely displace the use of wax tailings. In certain cases asphalt might still be used, as for example, when a gray or brown color is desired and this can be obtained by mixing asphalt, wax tailings, and rosin in proportions of 20 per cent. asphalt, 30 per cent. resin and 50 per cent. wax tailings.

I claim as my invention:

1. The process of making a bituminous composition which consists in making an aqueous paste containing finely divided colloidal particles, amalgamating the paste with the bitumen while the latter is still in a fluid condition, combining the above matrix with an inert filler of comminuted fibrous character, and then forming the same into a relatively thin sheet on a suitable support, drying the paste and thus allowing the bitumen to coalesce with the filler.

2. The process of making a bituminous composition which consists in making an aqueous paste containing finely divided mineral matter having a substantial proportion of inorganic colloidal particles, mixing the paste with asphalt while the latter is in fluid condition, combining the above matrix with an inert filler of comminuted fibrous constituency and then applying the same cold on a suitable foundation, and allowing the composition to set, thus permitting the water to evaporate and the bitumen to coalesce with the filler.

3. The process of making water proof composition which consists in making an aqueous paste with a colloidal material, adding a bituminous binder while the bitumen is in a liquid condition, stirring the bitumen and paste together until they are thoroughly amalgamated with each other, mixing the above composition with a comminuted fibrous material so as to thoroughly incorporate the fibers with the binder, forming the above mixture in a sheet while still contained in the aqueous vehicle, drying out the water, and allowing the bitumen to coalesce and unite with the fiber.

4. A process of forming a waterproof composition consisting in mixing a colloidal material with water to form an aqueous paste, adding a bitumen while in liquid form to the paste and stirring the two together to thoroughly amalgamate the bitumen with the colloidal material, thoroughly incorporating the comminuted fiber with the above mixture, forming this composition into a sheet while it is still contained in its aqueous vehicle, drying out the water at a temperature below that at which any substantial portion of the bitumen will volatilize and thus allowing the bitumen to coalesce and unite with the fibers to form a water proof construction.

5. A process of making an emulsion consisting in making an aqueous paste of water and material having a substantial percentage of colloidal particles, adding thereto a bitumen while the latter is in a heated fluid condition and effecting an amalgamation of the two and adding water to the mixture and so incorporating the materials with each other as to form the emulsion.

LESTER KIRSCHBRAUN.